United States Patent [19]
Van Cleve

[11] Patent Number: 4,757,633
[45] Date of Patent: Jul. 19, 1988

[54] REMOTE CONTROL FISH TROLLING DEVICE

[75] Inventor: Gary P. Van Cleve, Oak Harbor, Wash.

[73] Assignee: William B. Allen, Clinton, Wash.; a part interest

[21] Appl. No.: 7,006

[22] Filed: Jan. 23, 1987

[51] Int. Cl.⁴ .............................................. A01K 97/00
[52] U.S. Cl. .................................................... 43/26.1
[58] Field of Search ........................................ 43/26.1

[56] References Cited

U.S. PATENT DOCUMENTS

| | | | |
|---|---|---|---|
| 3,074,195 | 1/1963 | Vanderpool | 43/26.1 |
| 3,099,099 | 7/1963 | Cahen | 43/43.13 |
| 3,599,370 | 8/1971 | Armata | 43/26.1 |
| 3,613,284 | 10/1971 | Anderson | 43/26.1 |
| 3,793,761 | 2/1974 | Bonham | 43/26.1 |
| 4,161,077 | 7/1979 | Ciaccio et al. | 43/26.1 |
| 4,339,888 | 7/1982 | Sheng-Jung | 43/26.1 |

FOREIGN PATENT DOCUMENTS 1918383 10/1969 Fed. Rep. of Germany ....... 43/26.1

Primary Examiner—Gene P. Crosby
Attorney, Agent, or Firm—Wells, St. John & Roberts

[57] ABSTRACT

A remote controlled fish trolling vessel 10 is described for trolling a fish line remote from a fisherman in response to transmitted radio commands. The vessel 10 has a miniature hull 15 with a depending electrical motor and propeller assembly 42 for propelling the vessel. A rudder 58 is provided that is for turning the vessel. A control means controls the direction and speed of the vessel 10. A fish line attaching arrangement 96 having a first magnet 110 affixed to the fishing line and a second magnet 102 mounted to a housing in which the spacing between the magnets 102 and 110 may be adjusted to adjust the tension required to release the fishing line.

1 Claim, 4 Drawing Sheets

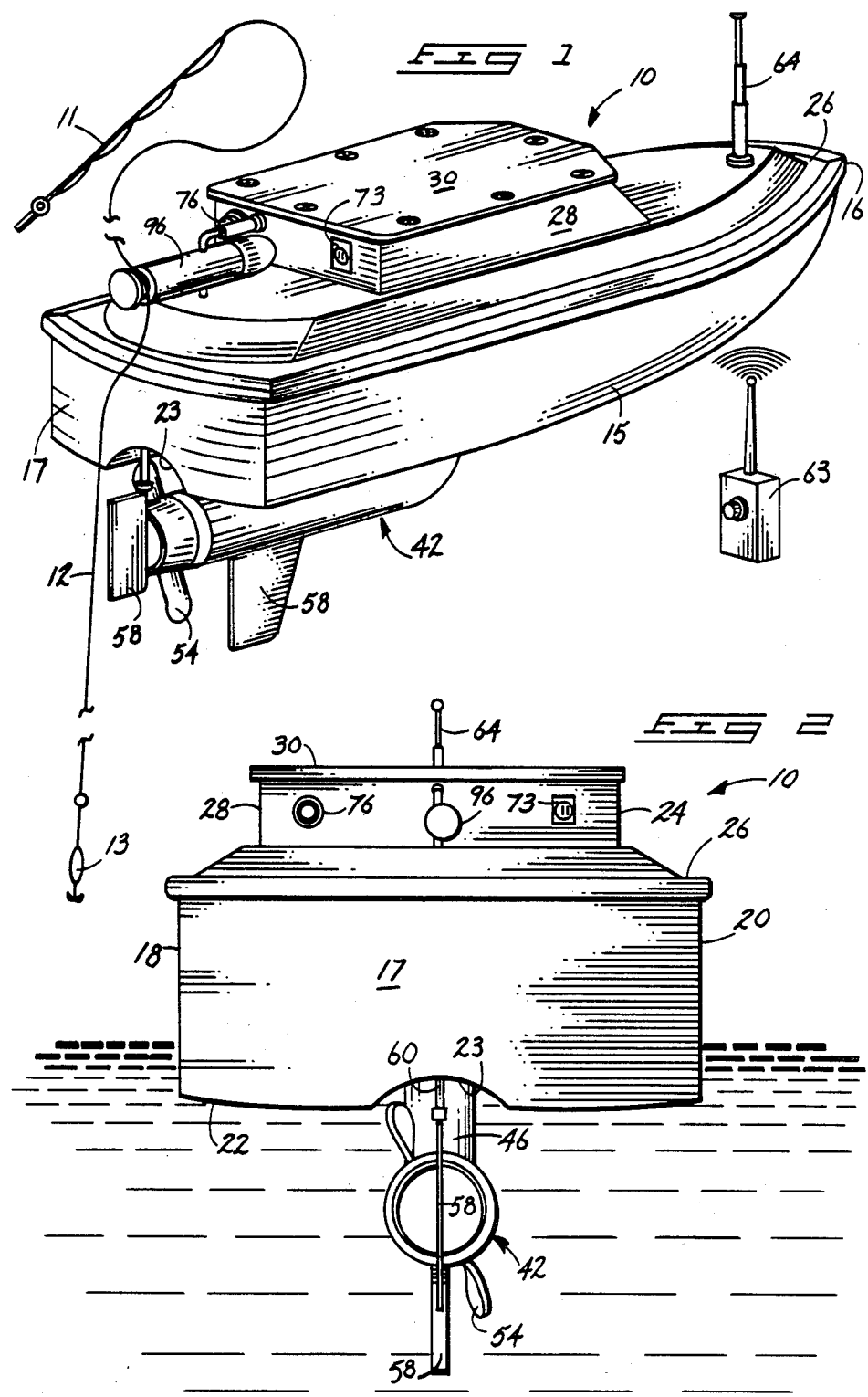

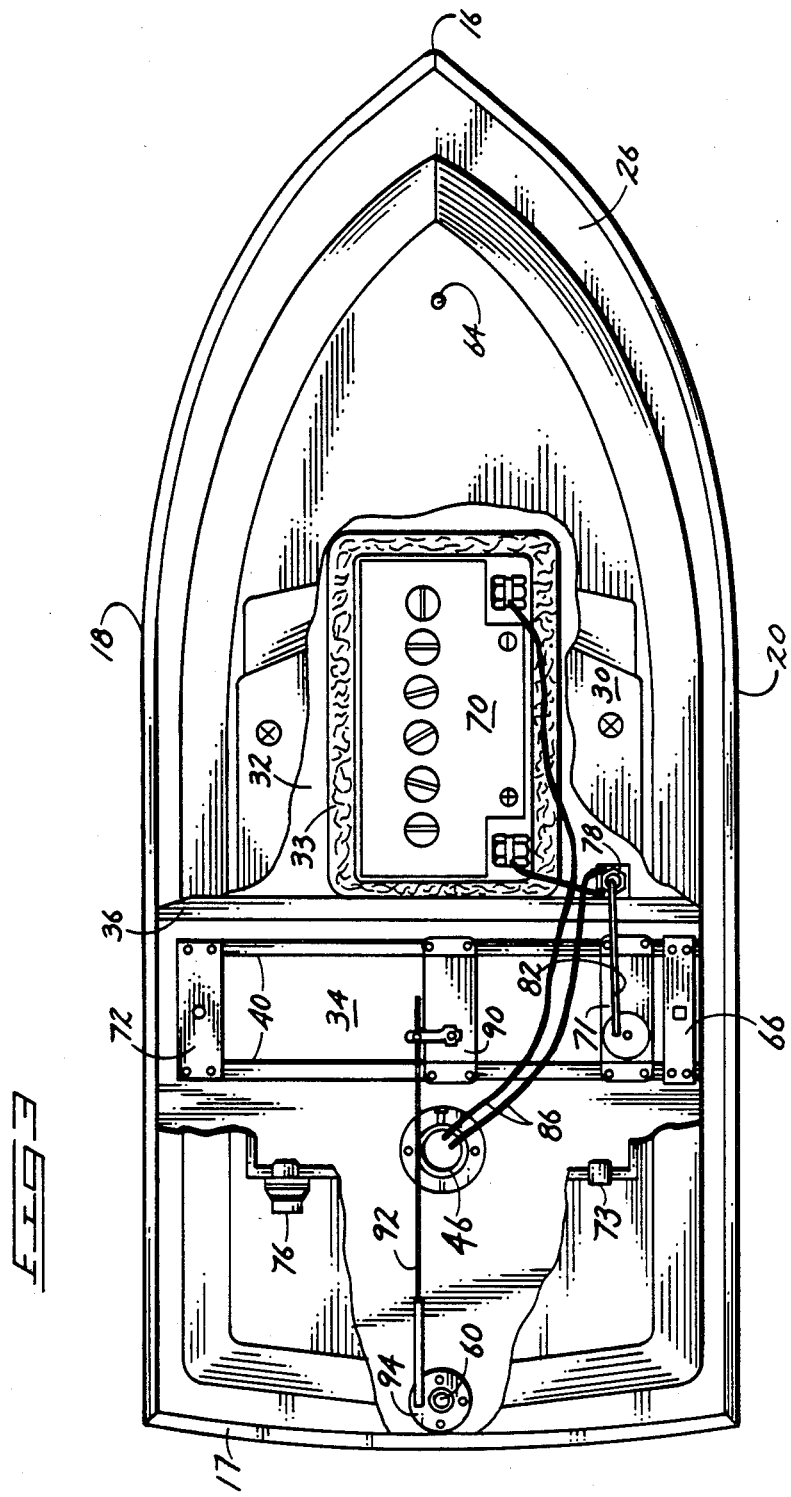

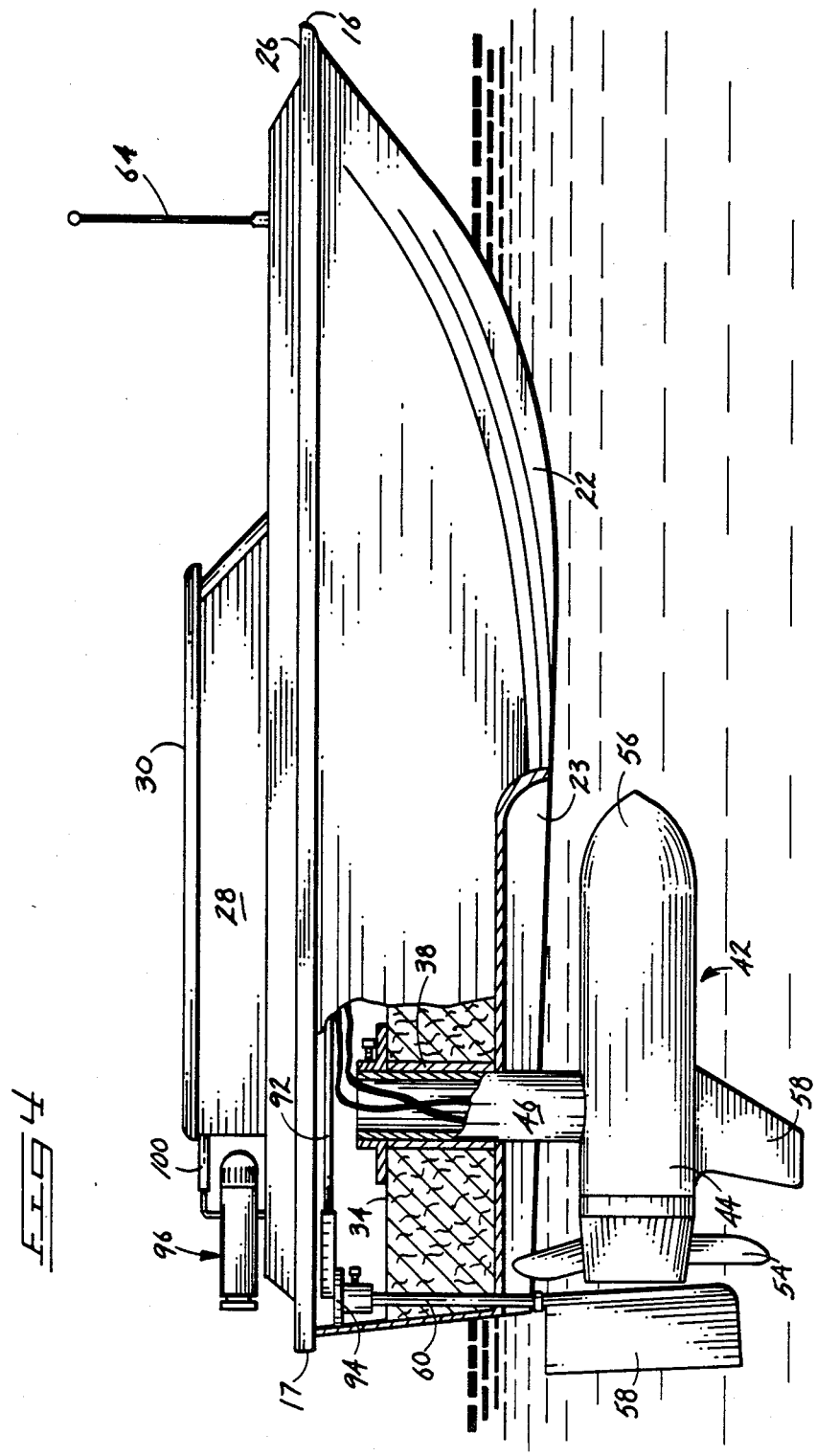

REMOTE CONTROL FISH TROLLING DEVICE

BACKGROUND OF THE INVENTION

This invention relates to fish trolling devices, and more particularly to remote control fish trolling devices to assist a fisherman.

It is difficult for a fisherman that is without a boat and standing on a dock, pier, or the bank to troll for fish in an effective manner. Additionally, it is frequently desirable for a fisherman that has a boat to anchor the boat and have a small miniature trolling device that the fisherman can direct into specific areas where the larger boat may not have access. Additionally, it is sometimes advantageous for a group of fisherman on a boat to anchor the boat and use remote trolling devices and go in various directions so that their fishing lines are less likely to become entangled. Remote controlled fishing devices in and or themselves are not new. Such devices are illustrated in U.S. Pat. No. 3,793,761 to Bonham granted Feb. 26, 1974, and U.S. Pat. No. 4,161,077 to Ciaccio, et al granted July 17, 1979. The former patent illustrates a remote control miniature trolling vessel that has a mount for receiving a fishing pole. The remote control has ability to change the direction of movement of the vessel through the water. U.S. Pat. No. 4,161,077 describes a radio-controlled fishing apparatus that is capable of connecting to the fishing line intermediate the position of the fisherman and the fishing lure for trolling the fishing lure behind the vessel in response to the command signals of a radio transmitter. One of the disadvantages of the vessel illustrated in such patent is its relative instability. It is relatively easy for large waves to capsize the small vessel and to render it ineffective for use on large bodies of water or on the oceans. Furthermore, the system illustrated in U.S. Pat. No. 4,161,077 has a relatively ineffective means for adjusting the tension on the fishing line at which the trolling vessel will release the fishing line.

These and other advantages of this invention will become apparent upon reading the following detailed description of the preferred embodiment.

BRIEF DESCRIPTION OF THE DRAWINGS

The preferred embodiment of this invention is illustrated in the accompanying drawings, in which:

FIG. 1 illustrates a perspective view of a radio-controlled fish trolling device in accordance with the teachings of the present invention;

FIG. 2 is a rear view of the radio-controlled fish trolling device illustrated in FIG. 1.

FIG. 3 is a top view of the radio-controlled fish trolling vessel illustrated in FIG. 1;

FIG. 4 is a side view of the vessel illustrated in FIG. 1;

DETAILED DESCRIPTION OF THE PREFERRED EMBODIMENT

Figure 5:
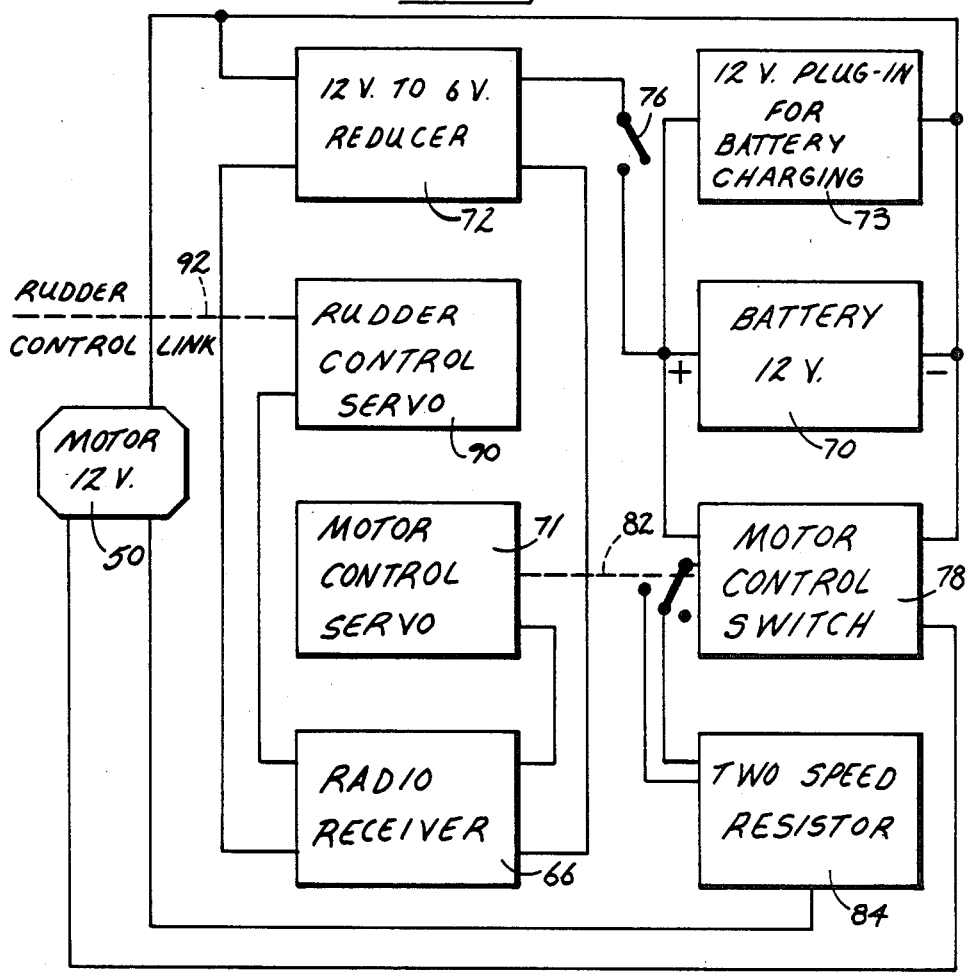
FIG. 5 is an electrical schematic of the power control system utilized with respect to the vessel illustrated in FIG. 1.

In compliance with the constitutional purpose of the Patent Laws "to promote the progress of science and useful arts" (Article 1, Section 8), applicant submits the following disclosure of the invention.

The preferred embodiment of this invention is illustrated in the accompanying drawings in which FIG. 1 illustrates a remote controlled fish trolling device having a remote control fish trolling vessel 10 for releasably connecting to a fishing line 12 intermediate a fisherman and a fishing lure 13. Specifically, the fisherman controls the fishing line utilizing a fishing pole 11. On the end outer of the fisher line is the fishing lure 13. The term "lure" is used quite broadly and incudes artificial lures, live bait, and any other element utilized for catching fish at or near the end of a fishing line. The purpose of the vessel 10 is to pull the fishing lure 13 through the water remote from the fisherman in a direction and at a speed dictated by command radio wave signals generated by a radio transmitter 63. The vessel 10 is releasably connected to the fishing line 12 so that when a fish is hooked, tension on the line will release the line from the vessel and the fisherman is able to play the fish and hopefully bring the fish to the fisherman.

The miniature vessel 10 includes a miniature hull 15 that extends from the bow 16 rearward to a stern 17. The hull has a port 18 and a starboard 20. The hull 15 has a lower hull section 22 that extends below the surface of the water. The lower hull section 22 has a longitudinal flow cavity 23 centrally positioned in the hull for permitting water to flow through the cavity.

The hull 15 has an upper hull section 24 composed of a deck 26 and a superstructure wall 28. A superstructure cover 30 is provided to permit access to the interior of the hull during repairs. It is preferable that the vessel 10 be watertight so that should the vessel encounter rough water or waves, moisture will not interfere with the operation of the vessel even though the waves could easily roll over the vessel.

The hull 15 includes a forward compartment 32 having a battery receptacle 33 (FIG. 3). The hull 13 additionally has a rear compartment 34 referred to as the control compartment that is separated from the forward or battery compartment 32 by a bulkhead 36. A motor post sleeve 38 (FIG. 4) is mounted upright substantially vertical in the rear compartment 34 having an opening in the lower hull section 22 in the longitudinal flow cavity 23. Additionally, the rear compartment 34 includes transverse mounting members 40 (FIG. 3) for mounting and receiving several electrical components.

The vessel 10 has a unitary motor and propeller assembly 42 that is mounted to the vessel and is suspended below the hull section 22. The assembly 42 has a housing 44 that includes a cylindrical post 46 (FIG. 4) that projects upward into the motor post sleeve 38. The housing 44 includes a fluid dynamic casing 48 surrounding an electrical DC motor. The motor has a shaft on which the propeller 54 is directly mounted. The post 46 is positioned so that the profile or outer extension of the propeller as it is rotated projects into the longitudinal flow cavity 23 to cause the water to flow through the longitudinal flow cavity 23 to facilitate longitudinal control and stability and to increase the efficiency of the flow characteristics of the vessel through the water.

The casing 48 has a fluid dynamic front end 56 to reduce the friction of the projected motor and propeller assembly. The assembly 42 has a keel 58 that is an integral part of the housing 44 and extends downward below the motor and prop for stabilizing the vessel. Since the motor and prop are relatively heavy with respect to the vessel, the motor and propeller assembly 42 stabilize the vessel to prevent the vessel from capsizing even in rough waters. If the vessel is rolled, it will immediately right itself and continue on with its mission.

The vessel 10 includes a pivotal rudder 58 that is attached to a rudder shaft 60 in which the rudder is positioned immediately behind the propeller to direct the prop wash in the desired direction to provide directional control to the vessel. The rudder shaft 60 extends upward through the lower hull section 22 into the rear compartment 34 (FIG. 4).

The vessel 10 is controlled in response to command radio waves that are generated from the radio wave transmitter 63 illustrated in FIG. 1. The transmitter may be positioned or controlled by the fisherman, or may be positioned at another location and controlled by another party who is assisting the fisherman from an advantage point or in assisting the fisherman in learning how to fish in a learning situation.

To receive the transmitted radio waves, the vessel has a receiver system that includes an antenna 64 that is mounted on the hull and projects upward for receiving the radio waves. Additionally, the receiver system includes a radio receiver 66 (FIG. 3) that is connected to the antenna and is positioned in the rear compartment 34.

Additionally, the vessel 10 includes a power system that includes a DC battery 70 for providing the electrical power for propelling and controlling the operation of the vessel in response to the radio wave commands. In addition to the battery 70, the power system 68 includes a voltage reducer 72 for reducing the power voltage to a control voltage. Preferably, the voltage reducer reduces a 12 volt supply from the battery to a 6 volt control supply. The power system 68 additionally includes a battery recharge plug or receptacle 73 that is mounted on the rear side of the superstructure wall 68 for permitting the battery to be recharged without having to take off the cover 30. Additionally, the power system has an on/off manual switch 76 that is additionally mounted on the back of the superstructure wall 28. When the vessel is initially put in the water, the on/off switch is turned to the "on" position to permit operation of the vessel. When the vessel is removed from the water, the manual switch 76 is normally turned "off."

The vessel 10 additionally has a speed control system that includes a speed control switch 78 (FIGS. 3 and 5) that is operated in response to the radio waves to control the speed of the motor 50 and thus the speed at which the vessel is propelled through the water. The speed control system includes a motor controlled servo 71 that is operative and connected to the radio receiver 66 for receiving speed control signals to operate the speed control switch 78 through linkage 82. The speed control switch 78 is a three position switch having an off position, a full speed position, and a slow speed position. A resistor 84 (FIG. 5) is provided in the electrical circuit for reducing the voltage to enable the vessel to be operated at a slower speed when the third position of the switch is activated by the servo through the linkage 82. A motor power cable 86 is then connected between the speed control switch 78 and the motor 50 for controlling the voltage applied to the motor. The cable extends downward through the post 46 to the suspended motor 50.

As illustrated in FIG. 2, the vessel 10 has a directional control system generally that includes a rudder control servo 90 mounted in the rear compartment 34 having linkage 92 connected between the servo and the control collar 94 that is mounted on the upper end of the upper shaft 60. The rudder control servo is electrically connected to the radio receiver 66 to receive directional control commands to turn or pivot the rudder in response thereto to control the directional movement of the vessel through water.

Figure 6:
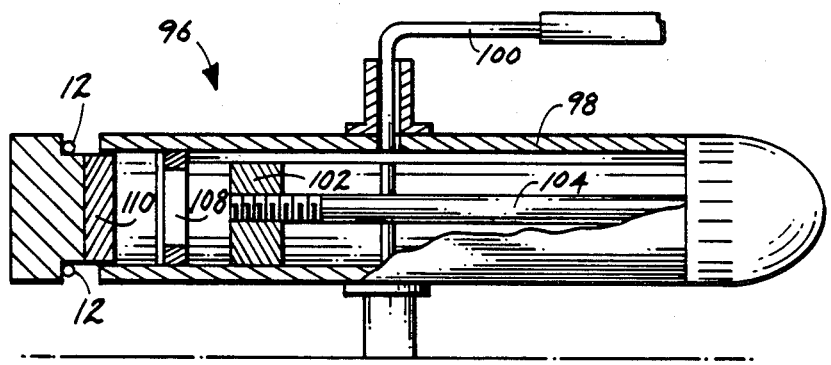
FIG. 6 is a cross-sectional detailed view of a fishing line attachment device that is utilized on the vessel for attaching to fishing line intermediate a lure and the fisherman.

The vessel further includes a fishing line attaching means (FIG. 6) generally designated with the numeral 96 that is mounted to the hull 15 preferably adjacent the stern 17 for releasably securing the fishing line 12 intermediate the lure 13 and the fisherman to pull and troll the lure 13 through the water. The attaching means 76 includes a housing 98 that is somewhat tubular that is pivotally mounted on a swivel bracket 100 to enable the tube which is generally horizontal in orientation to pivot about a substantially vertical axis to enable the vessel to troll the line at various angular positions behind the vessel. The attaching means 76 includes a first disc magnet 102 that is mounted on the interior of the housing 78 and is attached to a lead screw 104. The lead screw 104 is connected to a knob 106 at the forward end of the housing to enable the knob 106 to move the disc magnet longitudinally to adjust the tension or force required to pull or release the fishing line 12 from the vessel when a fish has been encountered. The housing 98 includes angular shoulder 108 for receiving a second disc magnet 110 in the end of the housing. The disc magnet 110 may be affixed to the fishing line 12 intermediate the fishing lure 13 and the fishing pole 11. The two magnets 102 and 110 attract each other and provide a releasable connection between the fishing line and the vessel. When the attractive magnetic force is overcome, the magnetic element 110, which is affixed to the fishing line 12 is released allowing the fisherman to control the operation of the fishing line and to draw the fish towards the fisherman. The tension by which the disc magnet 110 is held to the housing 98 is adjusted by the turning of the knob 106 to adjust the spacing between the holding magnet 102 and the release magnet 111.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

What is claimed is:

1. A remote controlled fish trolling vessel for trolling a fish line remote from a fisherman in response to transmitted command radio waves;

a miniature floatable vessel having a lower hull section projecting below the surface of the water;

an electrical motor and propeller assembly mounted to the vessel with both the motor and propeller projecting below the lower hull section for propelling the vessel over the surface of the water;

a rudder mounted on the vessel controlling the direction of movement of the vessel as the vessel is propelled through the water;

a radio wave receiver on the vessel for receiving the command radio waves;

control means operatively connected to the radio wave receiver, the rudder, and the electrical motor for controlling the speed and direction of the vessel with respect to the fisherman in response to the receipt of the command radio waves; and fishing line attaching means for releasably securing the fishing line to the vessel intermediate the fisherman and the fishing lure to troll the fishing line behind the vessel as the vessel is propelled over the water surface and to release the fishing line from the vessel when a fish is hooked to enable the fisherman to play the fish to the fisherman free of the trolling vessel;

wherein the fish line attaching means incudes:

a housing;

magnetic means having a first magnet affixed to the fishing line intermediate the fisherman and the fishing lure and a second magnet on the housing for magnetically releasably securing the first magnet to the housing until a fish is caught; and the fish line attaching means has tension adjusting means for adjustably spacing the first and second magnets to adjust the force required to release the first magnet from the fish line attaching means.

* * * * *